(12) United States Patent
Usui

(10) Patent No.: US 6,393,077 B1
(45) Date of Patent: May 21, 2002

(54) CORRECTION DETECTING DEVICE AND ITS METHOD

(75) Inventor: Takashi Usui, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/499,517

(22) Filed: Feb. 9, 2000

(30) Foreign Application Priority Data

Feb. 15, 1999 (JP) ............................................. 11-036238

(51) Int. Cl.[7] .............................. H04D 1/00; G06F 17/15
(52) U.S. Cl. ........................................ 375/343; 708/422
(58) Field of Search .................................. 375/343, 150, 375/152, 145, 144, 143, 340; 708/422, 426

(56) References Cited

U.S. PATENT DOCUMENTS

| | | | | |
|---|---|---|---|---|
| 5,706,082 A | * | 1/1998 | Colgan et al. | 356/311 |
| 5,903,610 A | * | 5/1999 | Skold et al. | 375/285 |
| 6,215,832 B1 | * | 4/2001 | Hitosi | 375/341 |
| 6,226,380 B1 | * | 5/2001 | Ding | 379/410 |

* cited by examiner

*Primary Examiner*—Chi Pham
*Assistant Examiner*—Khai Tran
(74) *Attorney, Agent, or Firm*—Jay H. Maioli

(57) ABSTRACT

A correlation detecting device and method for detecting a specified code contained in a received signal. Is characterized by detecting a predetermined code from a received signal by a matched filter as well as detecting the average amplitude of the received signal, multiplying the detected signal of the average amplitude by a threshold, comparing the multiplied signal with the output of the matched filter, and obtaining a correlation detecting signal based on the comparison. This can assure a correlation detection in a small circuitry at a low cost with only a multiplier as the computational unit for correlation detection.

6 Claims, 15 Drawing Sheets

FIG. 17
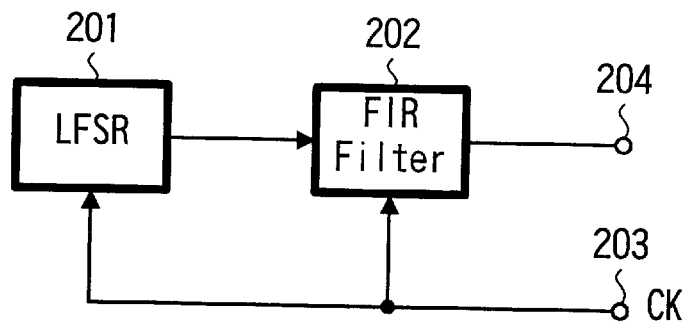
FIG. 18
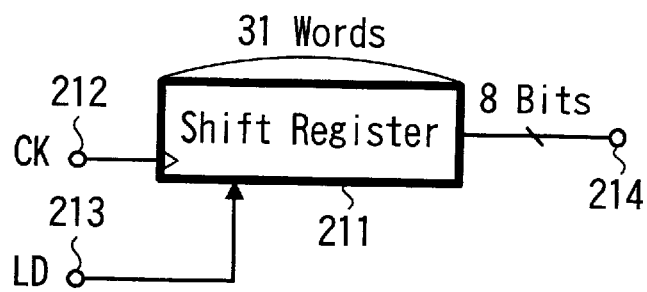
FIG. 19A  Clock CK  
FIG. 19B  LD Input  
FIG. 19C  PN Code Output  

FIG. 20
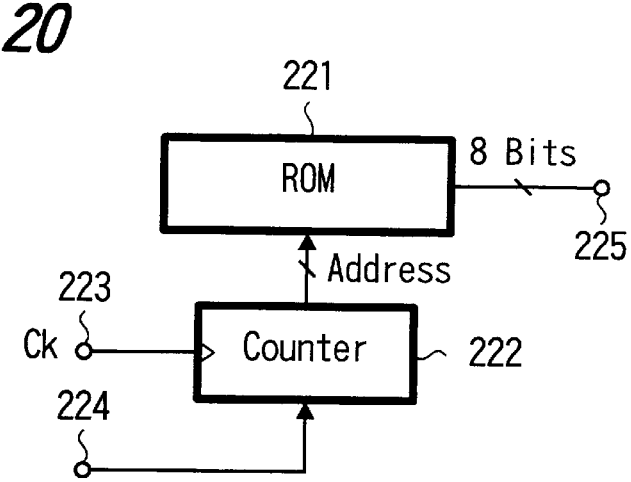
FIG. 21A Clock CK 
FIG. 21B LD Input 
FIG. 21C Counter Output 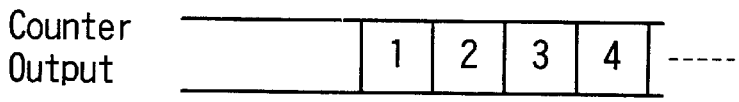
FIG. 21D PN Code Output 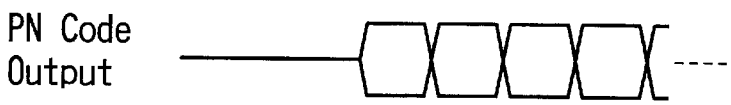
FIG. 22
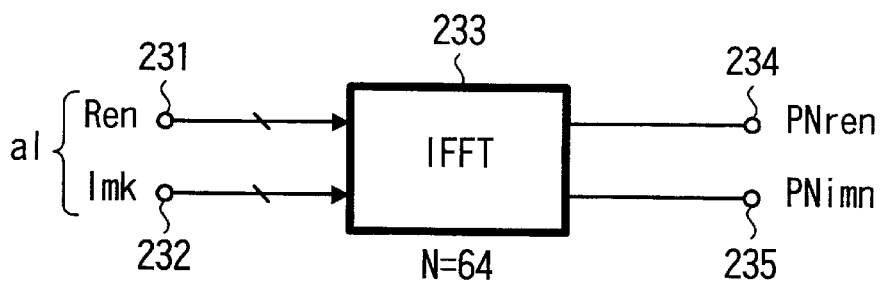

CORRECTION DETECTING DEVICE AND ITS METHOD

BACKGROUND OF THE INVENTION

1. Field of the Invention

The present invention relates to a correlation detecting device for detecting a specified code contained in a received signal and its method, and more particularly to a preferred correlation detecting device and its method suitable for use when setting the timing using a specified code in a wireless LAN wirelessly connecting a plurality of terminals.

2. Description of the Related Art

With an increase in ability of a computer, a LAN (Local Area Network) connecting a plurality of computers for the purpose of sharing files and data, and transfer of data and an electronic mail are prevalent. In the conventional LAN, each computer is connected together by wiring with an optical fiber, a coaxial cable, or a twisted pair cable.

This wired LAN, however, needs a work for connection. This makes it difficult to build up a LAN, and wiring becomes complicated in the cable LAN. Then, a wireless LAN has drawn attention as a system for releasing a user from wiring of the conventional wired LAN system.

As a wireless LAN, such a method as performing data communication by CDMA (Code Division Multiple Access) using spread spectrum, has been proposed. In the CDMA method, communication data is multiplied by a PN code (Pseudo Noise Code), and the spectrum of the communication data is spread. Thus spectrum spread and transferred data is multiplied by the same PN code as that of the transmitting side to be demodulated. The CDMA method is characterized by high secrete ability and high interference resistant ability.

With a progress in multimedia information, large data in amount such as image data and sound data is more often handled in these days. Accordingly, a wireless LAN is also required to speed up the transfer rate so as to transfer the large amount of data such as the image data and the sound data. However, if data transfer is performed, for example, at a high rate of about 30 Mbps, in the spread spectrum modulation, the bandwidth of more than 300 MHz will be required. This wide bandwidth cannot be ensured in the current frequency assignment, and it is difficult to do communication while ensuring this wide bandwidth.

The spread spectrum needs a synchronization capture time for adjusting the phase of the code of the transferred data to the phase of the code generated by a receiver for demodulation. Therefore, in the spread spectrum, a bit string for synchronization is inserted into each packet, for synchronization at a high speed, and this bit string for synchronization causes a problem of increasing the bits other than those of the effective data.

Then, the present applicant proposes a technique of transferring data in the OFDM (Orthogonal Frequency Division Multiplexing) method, performing data communication by the TDMA (Time Division Multiple Access) with one frame fixed as the unit, sending the Maximum Length Code at the head of one frame, setting the sending and receiving timing with the Maximum Length Code as a reference, and instructing the sending and receiving time of each wireless communication terminal according to the control information from a wireless communication control terminal. The OFDM method can increase the transfer rate, and assure the accurate demodulation even if there is a jitter. Since the sending and receiving timing is established, with the Maximum Length Code at the head of a frame made as a reference, it is possible to demodulate only a necessary symbol within a frame so as to reproduce the data by using this time information in reception.

When setting the timing upon receipt of the Maximum Length Code in this way, it is necessary to detect the Maximum Length Code from a received signal. As a circuit for detecting the Maximum Length Code like this, a correlation detecting circuit using a matched filter may be considered.

FIG. 23 shows an example of the correlation detecting circuit using a matched filter. In FIG. 23, a received signal from an input terminal 151 is supplied to a matched filter 152. The matched filter 152, that is a kind of FIR filter, comprises delay circuits 161-1, 161-2, 161-3, . . . , multipliers 162-1, 162-2, 162-3, and an adder 163 as shown FIG. 24. The coefficient of the multipliers 162-1, 162-2, 162-3, . . . is set at 1 or (−1) depending on the detected code. When a correlation between the code set to the coefficient of the multipliers 162-1, 162-2, 162-3, . . . and the received code is strong, the output level of the adder 163 becomes larger.

The matched filter 152 detects a correlation between the received code and the code set to the filter. The output of the matched filter 152 is supplied to a comparator 153. The comparator 153 compares the output of the matched filter 152 with a predetermined threshold TH.

Upon receipt of the Maximum Length Code, the output of the matched filter 152 becomes larger than the threshold TH. When the output of the matched filter 152 becomes larger than the threshold TH, a detected output appears from an output terminal 154.

In this system, however, each signal from a plurality of wireless communication terminals is time-division multiplexed within a frame to be, transferred and the level of each signal received by each wireless communication terminal and a wireless communication control terminal differs. Therefore, even if the received signal of the Maximum Length Code appears from the matched filter 152 which has received the Maximum Length Code, this signal output hides in the other signal component, and the signal of the Maximum Length Code cannot be detected easily.

Specifically, AGC (Automatic Gain Control) works on a received signal so as to control the level of the received signal at a constant level. When a signal of excess amplitude is input just before the signal of the Maximum Length Code in this condition, the AGC works so to reduce the gain. When the Maximum Length Code is received in a state of the reduced gain, the detected level of a correlation signal of the Maximum Length Code becomes smaller, and the correlation signal hides in the strong received signal, so that it cannot be detected. Even if only the vicinity of receiving the Maximum Length Code is extracted, the detected level of the correlation signal of the Maximum Length Code becomes less than the threshold, and so the signal of the Maximum Length code cannot be detected.

As described above, when a plurality of signals having various signal levels are sent in time division, a design of comparing the output of the matched filter with the threshold cannot assure the detection of the signal of the Maximum Length Code.

In order to solve the above problem, the present applicant previously proposed a correlation detecting circuit capable of detecting a correlation of the code of the received Maximum Length Code satisfactorily. FIG. 25 shows the structure of the correlation detecting circuit proposed previously, in which a received signal is supplied to an input terminal 171. The received signal is supplied to a matched filter 172 as well as to an average amplitude detecting circuit 173. The output of the matched filter 172 and the output of the average amplitude detecting circuit 173 are supplied to a divider 174. The divider 174 divides the output level Sa of the matched filter 172 by the output level Sb of the average amplitude detecting circuit 173. The output of the divider 174 is supplied to a comparator 175. The comparator 175 is provided with a predetermined threshold TH. The comparator 175 compares the output of the divider 174 with the threshold TH. The output of the comparator 175 is supplied to an output terminal 176 as the detected output of a correlation.

Referring to the correlation detecting circuit as shown in FIG. 25, when receiving the Maximum Length Code, the output level Sa of the matched filter 172 becomes larger. Therefore, the output of the divider 174 becomes larger than the predetermined threshold TH: Sa/Sb>TH; and a correlation detecting signal appears from the comparator 175. The correlation detecting signal is supplied from the output terminal 176.

When the amplitude of an input signal is great, the output level Sa of the matched filter 172 also becomes larger. However, when the amplitude of an input signal is great, not only the output level Sa of the matched filter 172 but also the output level Sb of the average amplitude detecting circuit 173 becomes larger. Therefore, the value (Sa/Sb) obtained by dividing the output level Sa of the matched filter 172 by the output level Sb of the average amplitude detecting circuit 173 hardly changes, and the output of the divider 174 is smaller than the predetermined threshold TH: Sa/Sb<TH. Therefore, no correlation detecting signal appears from the comparator 175.

Thus, when the output of the matched filter 172 is normalized by the amplitude level supplied from the average amplitude detecting circuit 173, the detected level does not become larger even if the level of the input signal becomes larger, and so the receipt of the Maximum Length Code can be detected correctly.

The correlation detecting circuit previously proposed, however, is defective in that its circuitry is complicated because of using a divider. To be specific, a divider needs larger size as compared with the other operational circuits such as a multiplier, because arithmetic operation of many digits at decimal level is required in the case of a divider performing an accurate division.

SUMMARY OF THE INVENTION

Accordingly, the present invention aims to detect the code sequence assuredly in a simple circuit without a divider, even if a plurality of signals of different amplitudes is time-division multiplexed.

A correlation detecting device according to the present invention comprises matched filtering means for detecting a predetermined code from a received signal, average amplitude detecting means for detecting the average amplitude of the received signal, multiplying means for multiplying an output of said average amplitude detecting means by a threshold, and comparing means for supplying a correlation detecting signal by comparison between the output of said matched filtering means and the output of said multiplying means.

A correlation detecting method according to the present invention comprises the steps of detecting a predetermined code from a received signal by a matched filter, detecting the average amplitude of the received signal, before multiplying the detected signal of the average amplitude by a threshold, and comparing the multiplied signal with the output of the matched filter to obtain a correlation detecting signal based on the above comparison.

According to the present invention, the output value of a matched filter is compared with the value obtained by multiplying the average amplitude by the threshold, so as to detect the Maximum Length Code from a received signal. Since the output of the matched filter is in proportion to the level of an input signal, the output becomes larger not only in the case of receiving the Maximum Length Code but also in the case of receiving a signal having a great level. When the level of the received signal is large, the output level of the matched filter becomes larger. At this moment, the average amplitude of the received signal becomes also large and the value obtained by multiplying the average amplitude by the threshold becomes large also. Therefore, when the output level of the matched filter is compared with the value obtained by multiplying the average amplitude by the threshold, the ratio of each level makes little change. On the contrary, the output level of the matched filter when receiving the Maximum Length Code is substantially kept at constant independently of the level of an input signal. Accordingly, by comparing between the output value of the matched filter and the value obtained by multiplying the average amplitude by the threshold to detect the Maximum Length Code from a received signal, the detection of the Maximum Length Code from the received signal is assured.

BRIEF DESCRIPTION OF THE DRAWINGS

FIG. 17 is a block diagram showing an example of the structure for generating the PN code to which the present invention can be applied (by using LFSR and FIR filter);

FIG. 18 is a block diagram showing another example of the structure for generating the PN code to which the present invention can be applied (by using a shift register);

FIG. 19 is a timing chart showing the state of generating the PN code in the example of FIG. 18;

FIG. 20 is a block diagram showing still another example of the structure for generating the PN (in which ROM is used) code to which the present invention can be applied;

FIG. 21 is a timing chart showing the state of generating the PN code in the example of FIG. 20;

FIG. 22 is a block diagram showing yet another example of the structure for generating the PN code (in which IFFT is used) to which the present invention can be applied;

DETAILED DESCRIPTION OF THE PREFERRED EMBODIMENT

Figure 1:
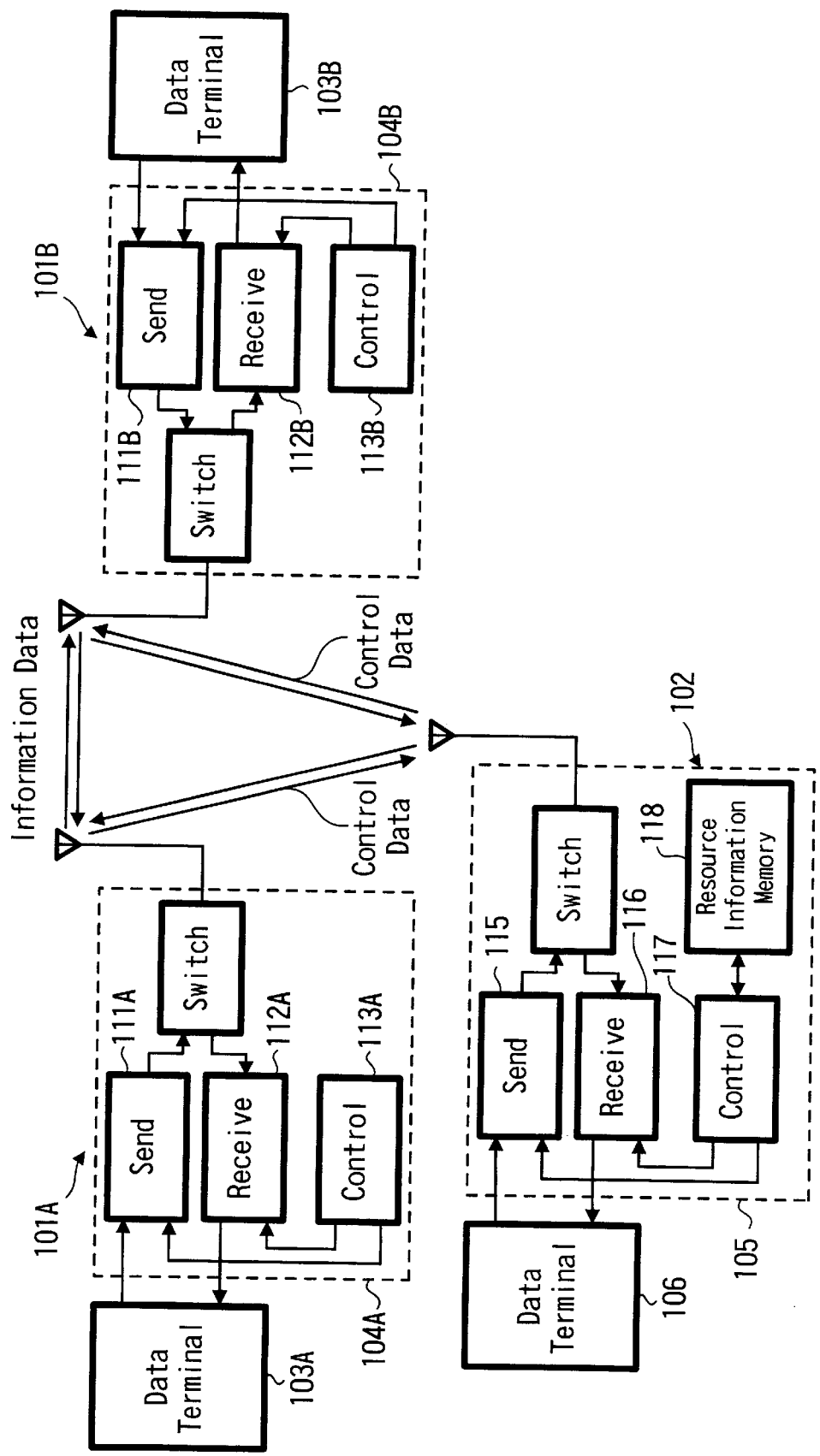
FIG. 1 is a block diagram showing the structure of a wireless LAN system to which the present invention can be applied.

Hereinafter, an embodiment according to the present invention will be described with reference to the accompanying drawings. FIG. 1 shows the outline of a wireless LAN system to which the present invention is applied. The wireless LAN system according to the present invention comprises a plurality of wireless communication terminals 101A, 101B, . . . , and a wireless communication control terminal 102. The wireless communication terminals 101A, 101B, . . . are formed by connecting data terminals 103A, 103B, . . . of a computer and the like to wireless communication units 104A, 104B, . . . . The wireless communication control terminal 102 is formed by connecting a data terminal 106 to a wireless communication unit 105. Data communication is performed among a plurality of wireless communication terminals 101A, 101B, . . . , and the data communication among the wireless communication terminals 101A, 101B, . . . is controlled by the wireless communication control terminal 102. By the way, the wireless communication terminal 102 may be formed by the wireless communication unit 105 only.

The respective wireless communication units 104A, 104B, . . . on the side of the wireless communication terminals 101A, 101B, . . . comprise respective sending units 111A, 111B, . . . , respective receiving units 112A, 112B, . . . , and the respective control units 113A, 113B, The sending units 111A, 111B, . . . , and the receiving units 112A, 112B, . . . , are designed to do wireless data communication by the OFDM method.

The wireless communication unit 105 on the side of the wireless communication control terminal 102 comprises a sending unit 115, a receiving unit 116, and a control unit 117. The sending unit 115 and the receiving unit 116 are designed to do wireless data communication by the OFDM method. The wireless communication unit 105 on the side of the wireless communication control terminal 102 is provided with a resource information storing unit 118 for storing the resource information relative to the assignment time of the data communication of the wireless communication terminal.

In this system, data communication is performed by the method. For example, the OFDM 147455 symbols (corresponding to 4 msec.) is defined as one frame, and data is transferred by the time division multiplexing within this frame.

At the head of one frame, the Maximum Length Code for synchronization is sent from the wireless communication unit 105 of the wireless communication control terminal 102. The Maximum Length Code for synchronization is received by the respective wireless communication units 104A, 104B, . . . of the respective wireless communication terminals 101A, 101B, . . . , and the frame cycle is measured with this receiving time as a reference, thus causing the data sending and receiving timing to be established.

When data communication is requested by the wireless communication terminals 101A, 101B, . . . , the request-to-send is transferred from the wireless communication units 104A, 104B, . . . of the wireless communication terminals 101A, 101B, . . . to the wireless communication unit 105 of the wireless communication control terminal 102. At the wireless communication unit 105 of the wireless communication control terminal 102, each sending assignment time of the wireless communication terminals 101A, 101B, . . . is determined based on this request-to-send and the resource information, and control information including the sending assignment time is sent to the respective wireless communication units 104A, 104B, . . . of the respective wireless communication terminal 101A, 101B, . . . from the wireless communication unit 105 of the wireless communication control terminal 102. The wireless communication units 104A, 104B, . . . of the respective wireless communication terminals 101A, 101B, . . . performs data transfer according to the sending assignment time. In this case, the sending and receiving timing of the data is determined with the Maximum Length Code for synchronization that is sent at the head of one frame as a reference.

Figure 2:
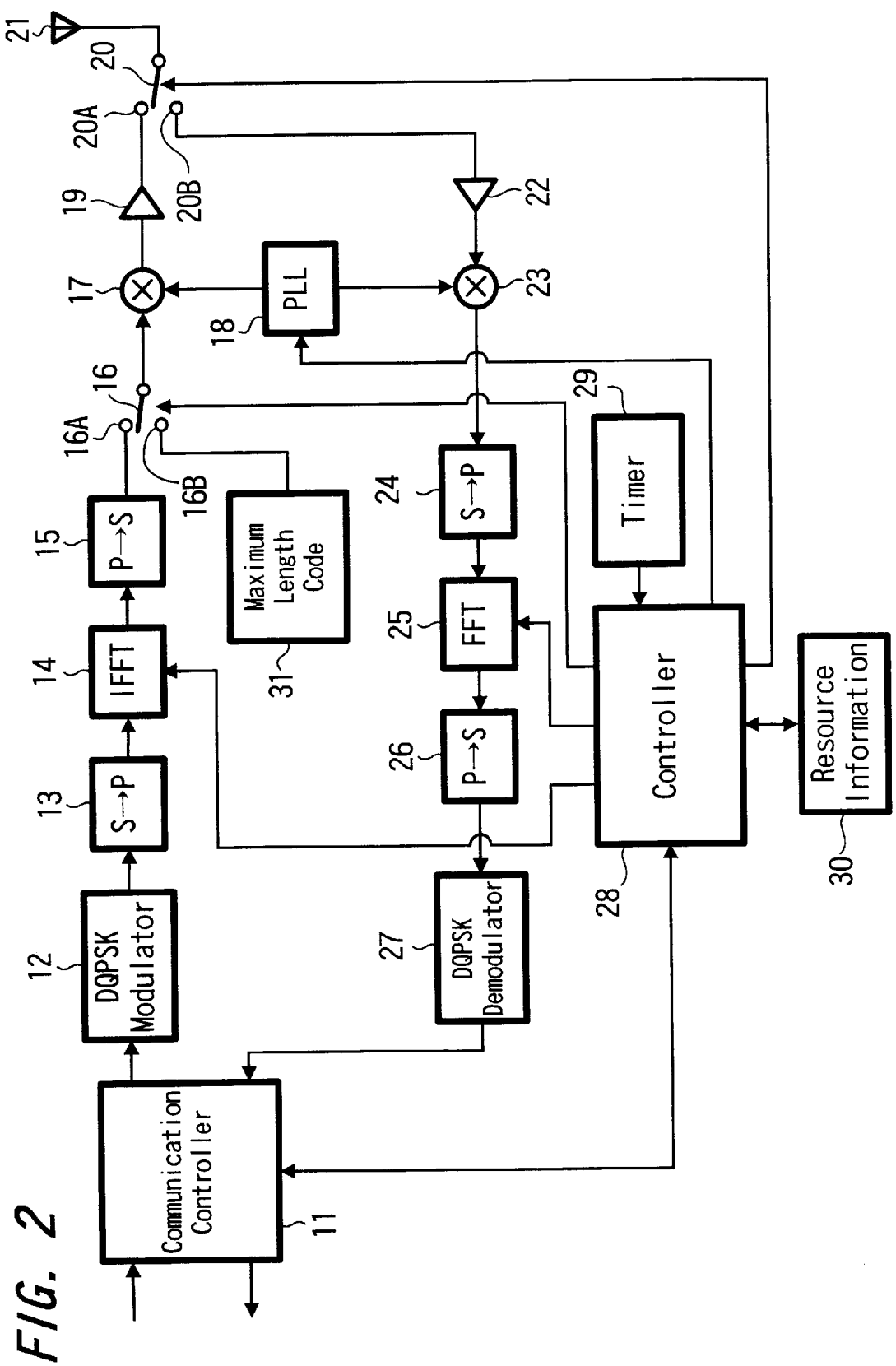
FIG. 2 is a block diagram showing one example of a wireless communication unit of a wireless communication control terminal in a wireless LAN system to which the present invention can be applied.

FIG. 2 shows the structure of the wireless communication unit 105 of the wireless communication control terminal 102. In FIG. 2, the reference numeral 11 denotes a communication controller, through which data is exchanged with the data terminal.

Transmission data from the communication controller 11 is supplied to a DQPSK (Differentially Encoded Quadrature Phase Shift Keying) modulator 12. The DQPSK modulator 12 modulates the transmission data by the DQPSK.

The output of the DQPSK modulator 12 is supplied to a serial/parallel converter 13. The serial/parallel converter 13 converts serial data into parallel data. The output of the serial/parallel converter 13 is supplied to an IFFT (Inverse Fast Fourier Transform) circuit 14. The IFFT circuit 14 performs mapping of the transmission data onto data of frequency domain, and converts this into data of time domain by the inverse Fourier transform. The output of the IFFT circuit 14 is supplied to a parallel/serial converter 15.

The serial/parallel converter 13, the IFFT circuit 14, and the parallel/serial converter 15 are to convert data into a multi-carrier signal by the OFDM method. The OFDM method uses a plurality of subcarriers in which interference between codes is prevented by making each carrier orthogonal, with a frequency interval therebetween defined as f0 and assigns a signal of low bit rate to each subcarrier, so as to obtain a signal of high bit rate as a whole.

Figure 3:
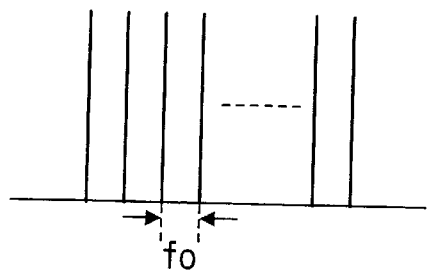
FIG. 3 shows a spectrum for use in describing the OFDM method.

FIG. 3 shows the spectrum of a carrier wave of the OFDM method. As shown in FIG. 3, in the OFDM method, a signal is transmitted by using subcarriers with frequency interval f0 that are mutually orthogonal.

In the OFDM, a transmission signal is mapped on the frequency domain, and then converted into the time domain from the frequency domain by the inverse FFT to create a signal. In decoding, the received waveform is acquired at every interval of f0, and the signal of the time domain is converted into a signal of the frequency domain by the FFT inversely.

Figure 4:
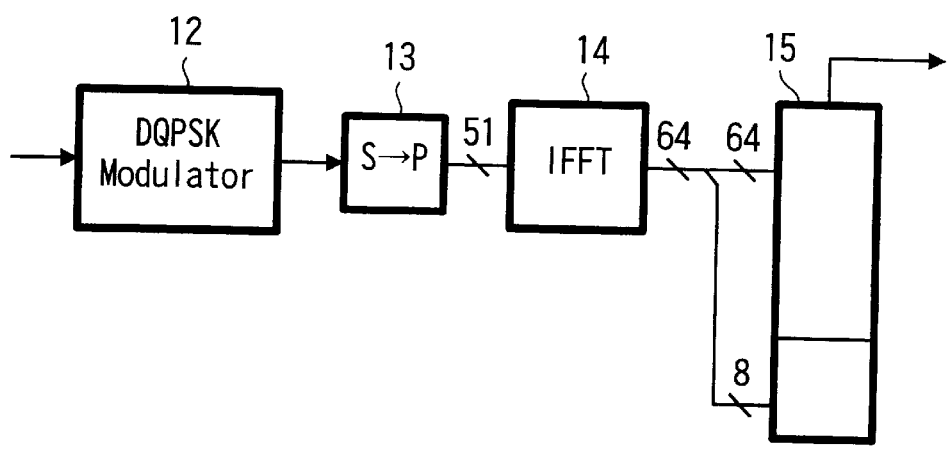
FIG. 4 is a block diagram for use in describing the OFDM method in a wireless LAN system , to which the present invention can be applied.
Figure 5:
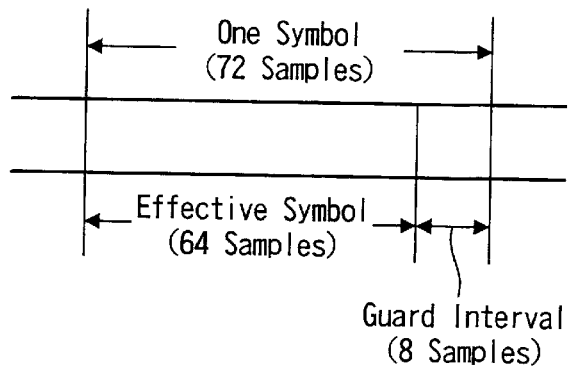
FIG. 5 is a schematic diagram for use in describing the OFDM method in a wireless LAN system, to which the present invention can be applied.

In this example, the serial/parallel converter 13 converts 51 samples output from the DQPSK modulator 12 into parallel data as shown in FIG. 4, and it is mapped on the frequency domain. The output of the serial/parallel converter 13 is converted into the data of the time domain by the IFFT circuit 14, from which the effective symbol of 64 samples is output. The guard interval of 8 symbols is added to the effective symbol of 64 samples.

Accordingly, in this example, one symbol consists of 72 samples including 64 samples of the effective symbol and 8 samples of the guard interval. The symbol period T symbol is, for example, T symbol=1.953 μsec.; the sample period, T sample is, for example, T sample=27.127 nsec.; and the sample frequency, f sample is, for example, f sample=36.864 MHz.

Since data is dispersed into a plurality of subcarriers for transmission in the OFDM method, the time per one symbol becomes longer. Since the guard interval is provided on the time axis, it is hard to suffer influence on jitter and multi-path advantageously. The guard interval is selected to be about 10% to 20% of the effective symbol length.

In other words, the OFDM method needs to perform the FFT by cutting out the effective symbol length from a received continuous signal in demodulation. Even if there is an error in cutting out the effective symbol owing to a jitter or the like, existence of the guard interval causes no change on the frequency component, but only the phase difference. Therefore, demodulation is enabled by the phase compensation of inserting a known pattern into a signal, or by canceling the phase difference using differential coding. In case of the ordinal QPSK modulation only, it is necessary to adjust timing at every bit; however, in case of the OFDM method, demodulation is possible only with some dB deterioration in sensitivity even if some bit deviation occurs.

In FIG. 2, the output of the parallel/serial converter 15 is supplied to the terminal 16A of a switch circuit 16. The output of the Maximum Length Code generation circuit 31 is supplied to the terminal 16B of the switch circuit 16.

The output of the switch circuit 16 is supplied to a frequency converter 17. A local oscillation signal is supplied from a PLL synthesizer 18 to the frequency converter 17. A transmission signal is converted into a predetermined frequency by the frequency converter 17. As a transmission frequency, for example, use of the quasi-microwave band such as 2.4 GHz, 5.7 GHz, 19 GHz may be considered.

The output of the frequency converter 17 is supplied to a power amplifier 19, which amplifies the power of the transmission signal. The output of the power amplifier 19 is supplied to the terminal 20A of a switch circuit 20. The switch circuit 20 is to be switched between at the sending time and the receiving time, and it is switched to the terminal 20A at the data sending time. The output of the switch circuit 20 is supplied to an antenna 21.

A received signal from the antenna 21 is supplied to the switch circuit 20. At the data receiving time, the switch circuit 20 is switched to the terminal 20B. The output of the switch circuit 20 is amplified through an LNA (Low Noise Amplifier) 22, and then supplied to a frequency converter 23.

A local oscillation signal is supplied from the PLL synthesizer 18 to the frequency converter 23, which converts a received signal into an intermediate frequency signal.

The output of the frequency converter 23 is supplied a serial/parallel converter 24, the output of which is supplied to an FFT circuit 25. The output of the FFT circuit 25 is supplied to a parallel/serial converter 26.

The serial/parallel converter 24, the FFT circuit 25, and the parallel/serial converter 26 are to perform decoding by the OFDM method. In other words, the effective data is cut out by the serial/parallel converter 24, and the received waveform is acquired at every interval of f0 to be converted into parallel data. The output of the serial/parallel converter 24 is supplied to the FFT circuit 25, where the signal of the time domain is converted into a signal of the frequency domain. Thus, the decoding by the OFDM method is executed by performing the FFT on the waveform sampled at every f0 interval.

The output of the parallel/serial converter 26 is supplied to a DQPSK demodulator 27, Where the DQPSK demodulation processing is performed. The output of the DQPSK demodulator 27 is supplied to the communication controller 11. The received data is output from the output of the communication controller 11.

The whole operation is controlled by a controller 28. Data sending and receiving is controlled by the communication controller 11 according to instructions from the controller 28.

This system is designed to send data in the TDMA method with one frame used as the unit and send the Maximum Length Code for synchronization to one symbol nat the head of one frame. In order to implement such a control, the wireless communication unit 105 of the wireless communication control terminal 102 is provided with the Maximum Length Code generation circuit 31, a resource information memory 30, and a timer 29. At the timing of the first symbol of a frame, the switch circuit 16 is switched to the terminal 16B. This causes the Maximum Length Code for one symbol to be transmitted at the timing of the frame head.

When a request-to-send is issued from the respective wireless communication units 104A, 104B, . . . of the respective wireless communication terminals 101A, 101B, . . . , this request-to-send is received by the antenna 21, OFDM demodulated by the FFT circuit 25, DQPSK demodulated by the DQPSK demodulator 27, and then supplied to the communication controller 11. The demodulated received data is sent from the communication controller 11 to the controller 28.

The controller 28 is provided with the resource information memory 30, which stores the resource information on the assignment time of the respective wireless communication terminals 101A, 101B, to be sent in one frame. The controller 28 determines the sending assignment time of the respective wireless communication terminals 101A, 101B, . . . , based on the received request-to-send and the remaining amount of the communication resource. The control information for sending assignment is sent from the controller 28 to the communication controller 11. The data from the communication controller 11 is DQPSK modulated by the DQPSK modulator 12, OFDM modulated by the IFFT circuit 14, and sent from the antenna 21 to the respective wireless communication units 104A, 104B, . . . of the respective wireless communication terminals 101A, 101B, . . . .

Figure 6:
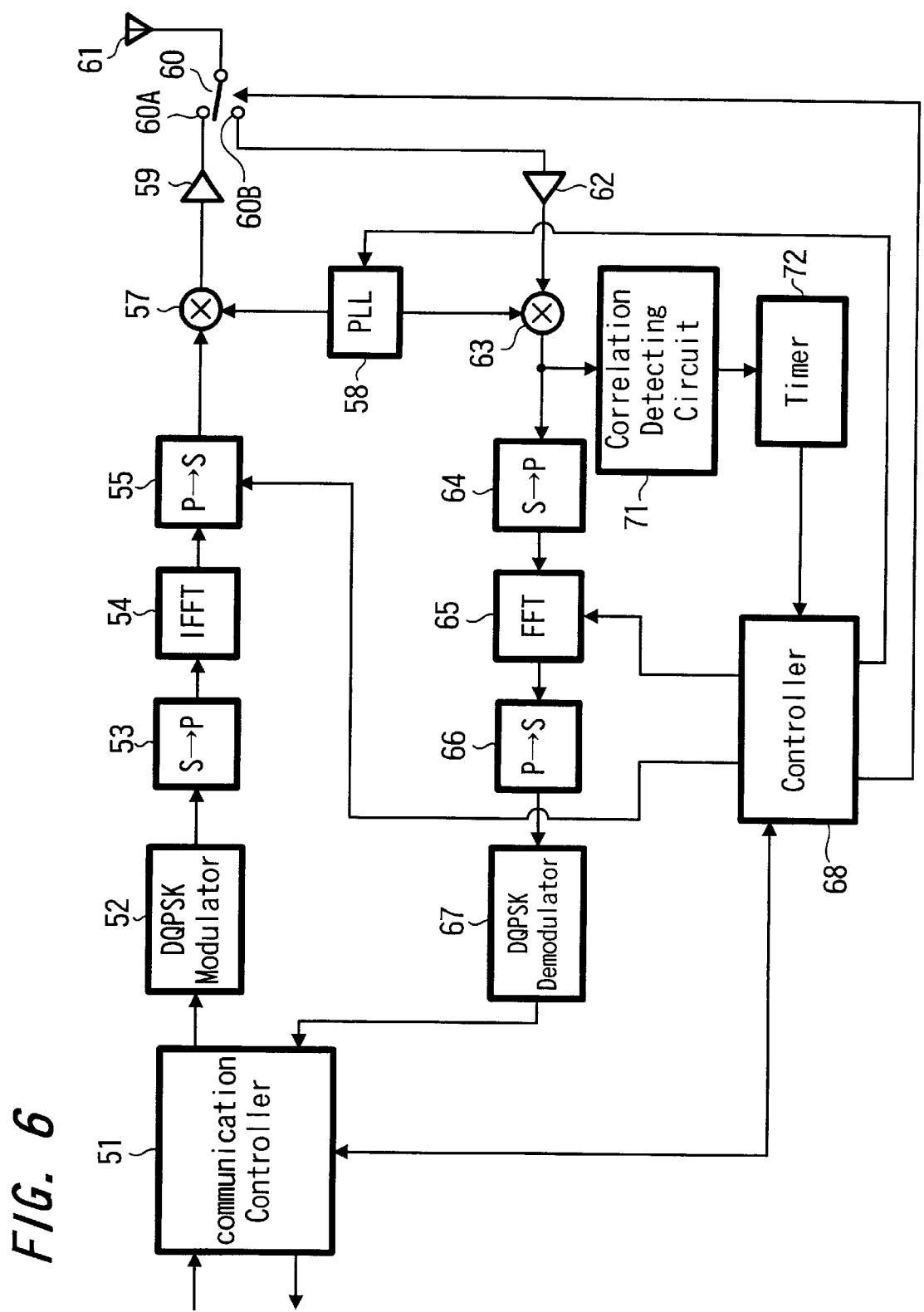
FIG. 6 is a block diagram for use in describing one example of a wireless communication unit of a wireless communication control terminal in a wireless LAN system, to which the present invention can be applied.

FIG. 6 shows the structure of the wireless communication units 104A, 104B, . . . of the wireless communication terminals 101A, 101B, . . . . In FIG. 6, transmission data is input through a communication controller 51. The transmission data from the communication controller 51 is supplied to a DQPSK modulator 52, which DQPSK modulates the transmission data.

The output of the DQPSK modulator 52 is supplied to a serial/parallel converter 53, which converts serial data into parallel data. The output of the serial/parallel converter 53 is supplied to an IFFT circuit 54. The IFFT circuit 54 maps the transmission data onto the data of the frequency domain, and the resulting data is converted into the data of the time domain by the inverse Fourier transform. The output of the IFFT circuit 54 is supplied to a parallel/serial converter 55. The serial/parallel converter 53, the IFFT circuit 54, and the parallel/serial converter 55 are to convert data into a multi-carrier signal by the OFDM method.

The output of the parallel/serial converter 55 is supplied to a frequency converter 57, to which a local oscillation signal is supplied from a PLL synthesizer 58. The transmission signal is converted into a predetermined frequency by the frequency converter 57.

The output of the frequency converter 57 is supplied to a power amplifier 59, which amplifies the power of the transmission signal. The output of the power amplifier 59 is supplied to the terminal 60A of a switch circuit 60, which is switched to the terminal 60A at the data sending. The output of the switch circuit 60 is supplied to an antenna 61.

A received signal from the antenna 61 is supplied to the switch circuit 60. At the data receiving, the switch circuit 60 is switched to the terminal 60B. The output of the switch circuit 60 is supplied to the frequency converter 63 after being amplified through the LAN 62.

A local oscillation signal is supplied from the PLL synthesizer 68 to the frequency converter 63, which converts the received signal into an intermediate frequency signal.

The output of the frequency converter 63 is supplied to a serial/parallel converter 64 and also to a correlation detecting circuit 71.

The output of the serial/parallel converter 64 is supplied to an FFT circuit 65, the output of which is supplied to a parallel/serial converter-66. The serial/parallel converter 64, the FFT circuit 65, and the parallel/serial converter 66 are to perform the OFDM demodulation.

The output of the parallel/serial converter 66 is supplied to a DQPSK demodulator 67, which performs the DQPSK demodulation processing. The output of the DQPSK demodulator 67 is supplied to the communication controller 51. The received data is supplied from the output of the communication controller 51.

The whole operation is controlled by a controller 68. Data sending and receiving is controlled by the communication controller 51 according to instructions from the controller 68.

This system is designed to send data in the TDMA method with one frame used as the unit and send the Maximum Length Code for synchronization from the wireless communication unit 105 of the wireless communication control terminal 102 to one symbol at the head of a frame. In order to implement this control, the wireless communication units 104A, 104B, . . . are each provided with a correlation detecting circuit 71 and a timer 72. At the timing of the head of frame, the Maximum Length Code sent from the wireless communication unit 105 of the wireless communication control terminal 102 is received by the antenna 61, and sent to the correlation detecting circuit 71. The correlation detecting circuit 71 detects correlation between the received code and a predetermined code, and when the correlation is decided to be high, a correlation detecting signal is output. The output of the correlation detecting circuit 71 is sent to the timer 72. The clock of the timer 72 is set based on the correlation detecting signal from the correlation detecting circuit 71.

When there is data to send, a request-to-send is sent from the communication controller 51 according to instructions from the controller 68. The request-to-send is DQPSK modulated by the DQPSK modulator 52, OFDM converted by the IFFT circuit 54, and,forwarded to the wireless communication control terminal 102 through the antenna 61. The wireless communication control terminal 102 receives the request-to-send and returns control information containing sending assignment time.

The control information is received by the antenna 61, OFDM demodulated by the FFT circuit 65, DQPSK demodulated by the DQPSK demodulator 67, and supplied to the communication controller 51. The demodulated signal data is sent from the communication controller 51 to the controller 68.

The control information contains the information about the sending hour. These hours are established based on the clock of the timer 72 as a reference. The timer 72 is set according to the output of the correlation detecting circuit 71. based on the timing of the Maximum Length Code sent from the wireless communication control terminal.

When the timer 72 indicates that it is the sending start time, the transmission data is supplied from the communication controller 51 according to instructions from the controller 68, DQPSK modulated by the DQPSK modulator 52, OFDM converted by the IFFT circuit 54, and supplied from the antenna 61. When the timer 72 indicates that it is the receiving time, received data is demodulated by the FFT circuit 65 according to instructions from the controller 68.

This system carries data by the OFDM using multi-carriers in this manner. The OFDM wave is, as mentioned above, proof against jitter, and even if some samples deviate, demodulation is possible. However, if the deviation is more than that and over two symbols, demodulation is impossible. Therefore, it is necessary to set the timing in some degree. Then, in this system, for example, 147455 symbols (4 msec.) is defined as one frame and data is transferred within this frame in the TDMA method. The Maximum Length Code is disposed in one symbol at the head of each frame, and use of this Maximum Length Code determines the demodulation timing.

If the receiving clock for the received OFDM wave has deviation of 6.8 ppm, time difference of 27.2 nsec. accumulates during one frame of 4 msec. This corresponds to the sampling rate of 36.864 MHz. Accordingly, use of the clock having the accuracy of about 6.8 ppm enables the assured demodulation.

As a symbol for synchronization, other than the Maximum Length Code, two kinds of Maximum Length Codes having equal cycle are prepared and the Gold code that is a code sequence obtained by adding these codes, Barker code, Kasami sequence or the like may be employed.

Figure 7:
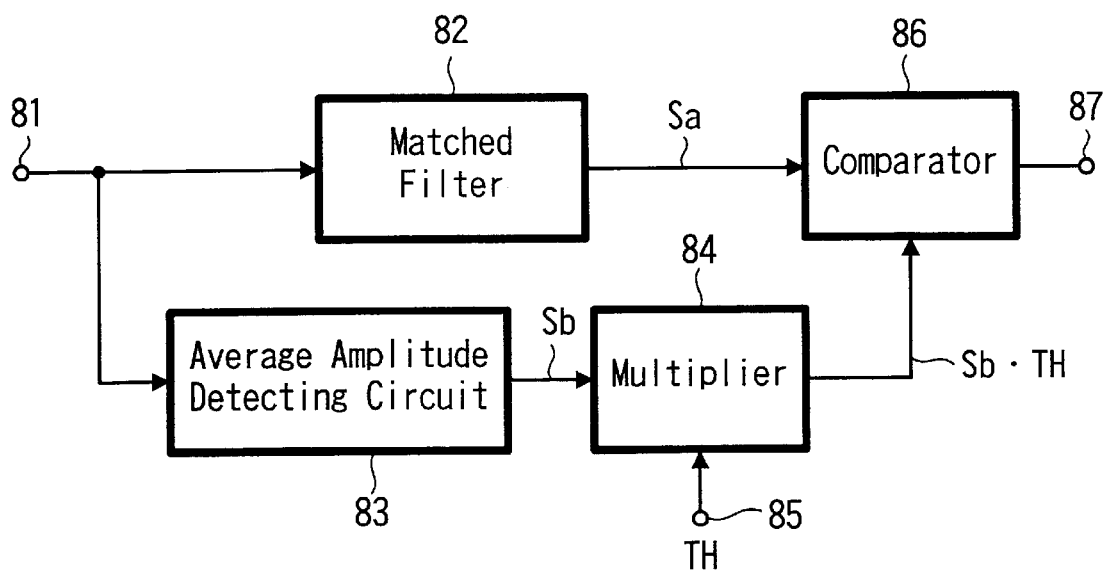
FIG. 7 is a block diagram showing one example of a correlation detecting circuit to which the present invention is been applied.

The correlation detecting circuit 71 in FIG. 6 can be formed as shown in FIG. 7. In FIG. 7, a received signal is supplied to an input terminal 81. The received signal is supplied to a matched filter 82 and also supplied to an average amplitude detecting circuit 83, which detects the average amplitude of a received signal and the detected signal of the average amplitude is supplied to a multiplier 84. A predetermined threshold TH is supplied from the terminal 85 to the multiplier 84, where the detected level Sb of the average amplitude is multiplied by the threshold TH. The signal level Sb·TH obtained by multiplication by the threshold TH in the multiplier 84 is supplied to a comparator 86, where the output level Sa of the matched filter 82 is compared with the signal level Sb·TH. The output of the comparator 86 is supplied from the output terminal 87 as a detected output of correlation value.

When the Maximum Length Code is being received, the output level Sa of the matched filter 82 becomes larger. Therefore, the output level Sa becomes greater than the Sb·TH obtained by multiplying the average amplitude level Sb detected by the average amplitude detecting circuit 83 by the threshold: Sa>Sb·TH; and the correlation detecting signal appears from the comparator 86. For example, a high-level signal "1" is output as the correlation detecting signal, which is supplied from the output terminal 87.

When the amplitude of an input signal is great, the output level Sa of the matched filter 82 also becomes greater. When the amplitude of the input signal is great, however, not only the output level Sa of the matched filter 82 becomes great, but also the Sb·TH obtained by multiplying the output level Sb of the average amplitude detecting circuit 83 by the threshold becomes great. Therefore, when the output level Sa of the matched filter 82 is compared with the multiplied value Sb·TH, no change occurs in the ratio, and proper selection of the threshold TH can turn to Sa<Sb·TH. Thus, no correlation detecting signal appears from the comparator 86. For example, a low-level signal "0" is output as the correlation detecting signal.

Comparing in this way, the output of the matched filter 82 with the value obtained by multiplying the level detected by the average amplitude detecting circuit 83 by the threshold enables the accurate detection of having received the Maximum Length Code.

Figure 8A:
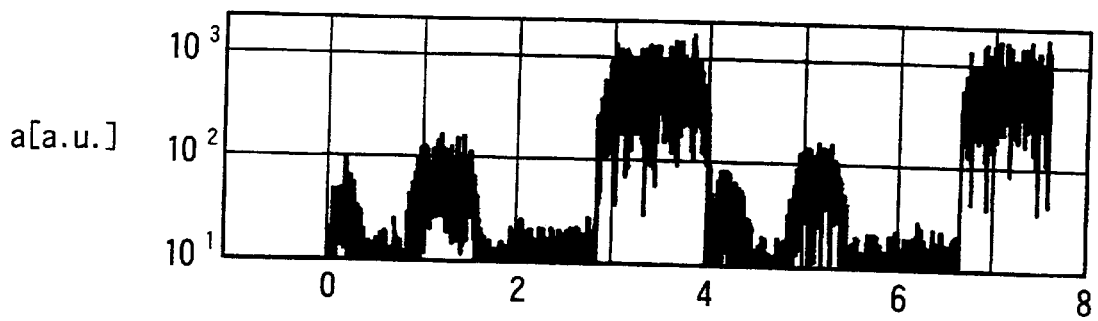
FIG. 8 shows a waveform for use in describing one example of a correlation detecting circuit to which the present invention is applied.
Figure 8B:
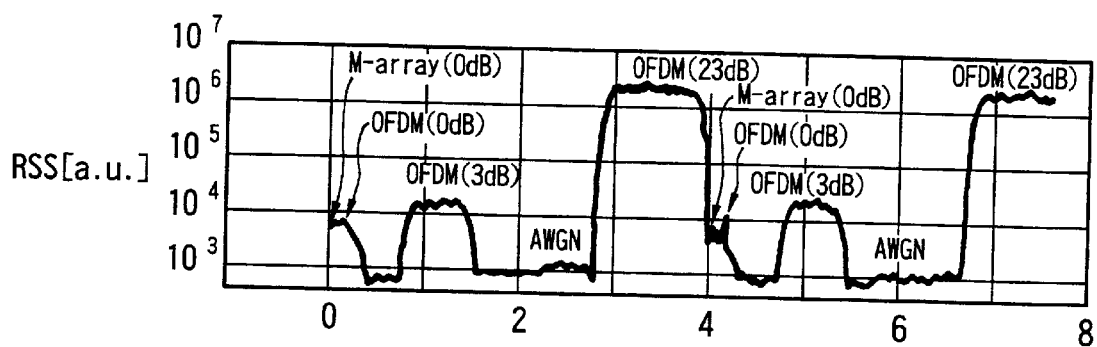
Figure 8C:
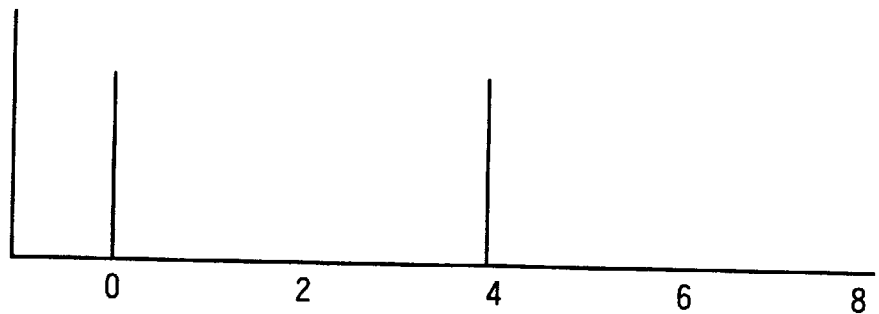

FIG. 8 shows the measurement results when a received signal is measured by such a correlation detecting circuit. FIG. 8A shows the output of the matched filter 82; FIG. 8B shows the output of the average amplitude detecting circuit 83; and FIG. 8C shows the output of the comparator 86.

Each signal from a plurality of wireless communication terminals 101A, 101B, or the wireless communication control terminal 102 is time-division multiplexed within one frame, thus resulting in change of the strength of the received signal of one frame. As shown in FIG. 8A, the output of the matched filter 82 changes depending on the signal level of the received signal.

Detecting the average amplitude of the received signal, a signal as shown in FIG. 8B is obtained from the average amplitude detecting circuit 83. When the output of the matched filter 82 shown in FIG. 8A is compared with the value obtained by multiplying the output of the average amplitude detecting circuit 83 shown in FIG. 8B by the threshold, if the output level of the matched filter 82 is greater than the value, a correlation detecting signal as shown in FIG. 8C is obtained.

Figure 25:
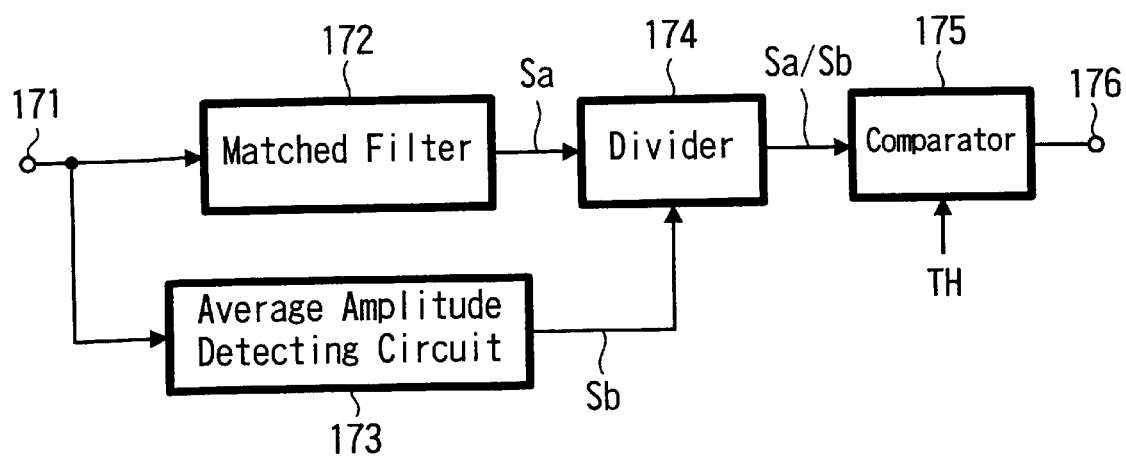
FIG. 25 is a block diagram showing one example of the correlation detecting circuit proposed earlier.

As shown in FIG. 8C, the detection of a received signal of the Maximum Length Code is ensured by the comparison between the output of the matched filter 82 and the value obtained by multiplying the output of the average amplitude detecting circuit 83 by the threshold. The accuracy of the correlation detecting circuit is equal to that of the circuit that has previously been proposed by the applicant (namely, the circuit of FIG. 25). Unlike the circuit shown in FIG. 25, the circuit of this case requires only a multiplier as a computing circuit and no complicated divider. Therefore, it is possible to implement a small-sized correlation detecting circuit of good quality having a simple structure at a low cost. Since the size of circuit is small, it is also possible to reduce power consumption in the circuit.

In the above-mentioned example, the output of the matched filter 82 is compared with the value obtained by multiplying the output of the average amplitude detecting circuit 83 by the threshold TH. This can be expressed mathematically as follows.

At first, the output level Sa of the matched filter 82 and the output level Sb of the average amplitude detecting circuit 83 are each expressed as follows.

$$Sa = \int_0^{Ts} r(t)P^*(t-\tau)dt$$

$$Sb = \sqrt{\int_0^{Ts}|r(t)|^2 dt}$$

where, r(t) represents a received signal and P(t) represents a code sequence. Since the comparator 86 is to detect Sa>Sb·TH or Sa<Sb·TH by comparison, it can be expressed as follows.

$$\int_0^{Ts} r(t)P^*(t-\tau)dt \gtreqless \sqrt{\int_0^{Ts}|r(t)|^2 dt} \cdot TH$$

In order to obtain the average amplitude of a received signal, a structure for obtaining the average amplitude based on the square of the real part of a complex number representative of a received signal and the square of the imaginary part thereof is required. However, obtaining the average amplitude based on the square of the real part and the square of the imaginary part of a received signal will cause an increase in the number of steps and the hardware for computation processing. Accordingly, it may be desired to reduce the number of steps and the hardware for computation processing by obtaining the average amplitude more simply based on the absolute value of the real part and the absolute value of the imaginary part of a complex number representative of a received signal. In the case of this structure for obtaining the average amplitude based on the absolute value of the real part and the absolute value of the imaginary part of a received signal, quality of detecting the average amplitude may be deteriorated in some degree. However, it is no matter in the case of obtaining a correlation detecting signal like this example.

Figure 9:
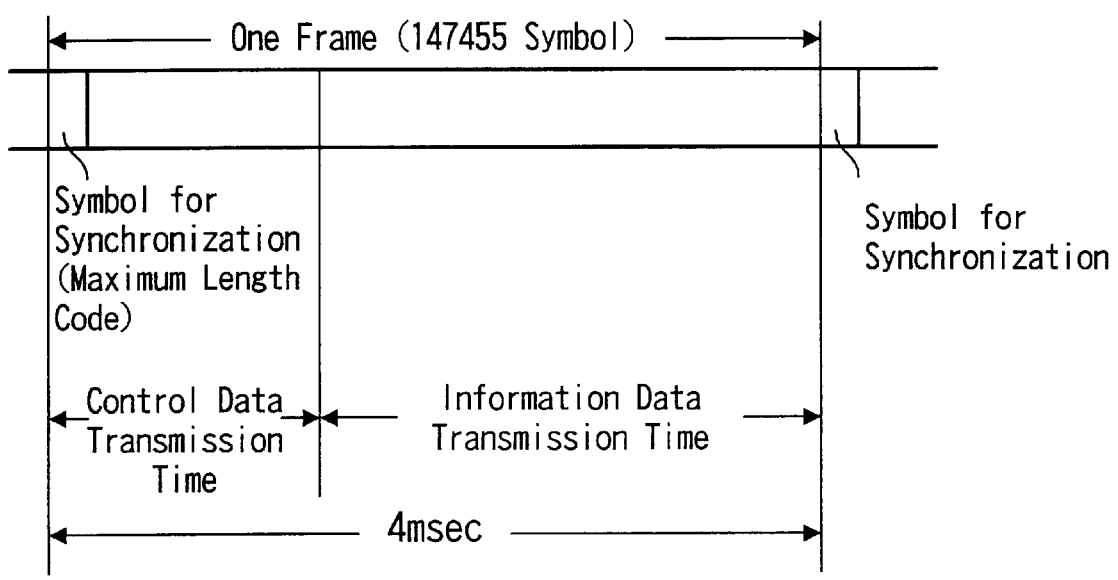
FIG. 9 is a schematic diagram for use in describing a wireless LAN system to which the present invention can be applied.

FIG. 9 shows the structure of one frame. As shown in FIG. 9, one frame is divided into control data transmission time and information data transmission time. During the control data transmission time, data is transmitted asynchronously, where as during the information transmission time, data is transmitted isochronously. Such a communication is performed asynchronously during the control data transmission time, as to send a symbol for synchronization from the wireless communication control terminal 102, send a request-to-send from the respective wireless communication terminals 101A, 101B, to the wireless communication control terminal 102, and send control information containing sending assignment time from the wireless communication control terminal 102 to the respective wireless communication terminals 101A, 101B, . . . According to the sending assignment time, the data communication among the respective communication terminals 101A, 101B, . . . is performed isochronously during the information transmission time.

In addition, it is also possible to do data communication asynchronously during the information transmission time, or it is also possible to mix the asynchronous communication and the isochronous communication.

For example, it is assumed that the data communication is performed between the wireless communication terminal 101A and the wireless communication terminal 101B in FIG. 1. In this case, such processing as shown in a sequence diagramd of FIG. 10 is performed, and the data communication is performed by the TDMA within one frame as shown in FIG. 11.

Figure 10:
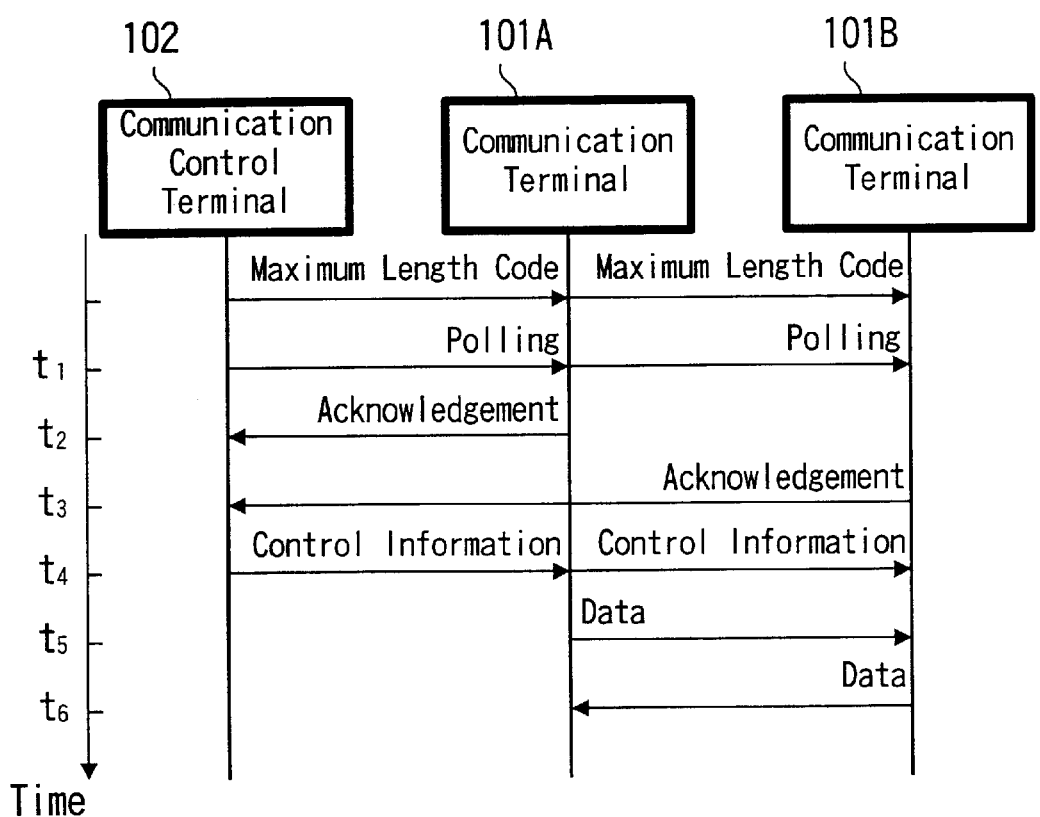
FIG. 10 is a sequence diagram for use in describing a wireless LAN system to which the present invention can be applied.
Figure 11:
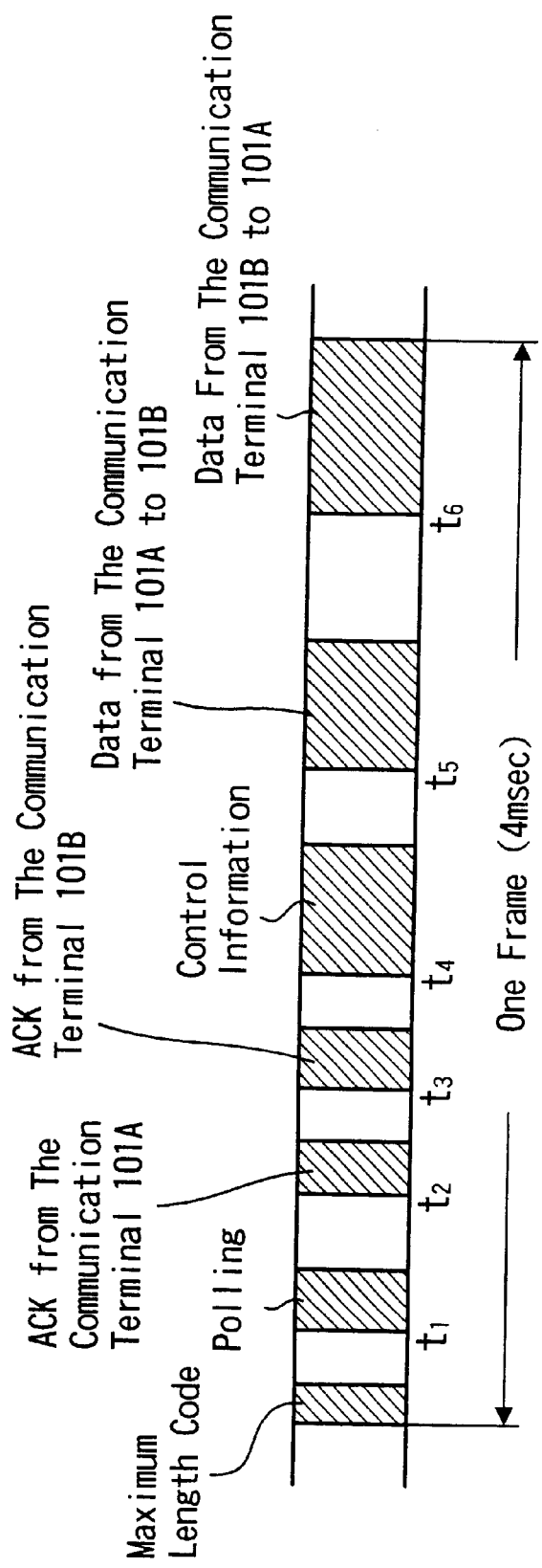
FIG. 11 is a schematic diagram for use in describing a wireless LAN system to which the present invention can be applied.

First of all, in one symbol at the head of one frame, the Maximum Length Code is sent from the wireless communication unit 105 of the wireless communication control terminal 102 to the wireless communication units 104A, 104B of the respective wireless communication terminals 101A, 101B, as shown in FIG. 10. The Maximum Length Code is received by the wireless communication units 104A and 104B of the respective wireless communication terminals 101A and 101B, and the timer 72 is set up according to the Maximum Length Code.

Next, the wireless communication terminals 101A, 101B are called by the wireless communication unit 105 of the wireless communication control terminal 102 at a time point t1. Upon receipt of the call, the wireless communication units 104A, 104B of the wireless communication terminals 101A, 101B return an acknowledgment signal for this call at time points t2 and t3. At this moment, when there is a request-to-send, this acknowledgment signal can contain the request-to-send. For example, it is assumed that the wireless communication terminal 101A has a data transfer request to send data to the wireless communication terminal 101B, and that the wireless communication terminal 101B has a data transfer request to send data to the wireless communication terminal 101A.

The wireless communication unit 105 of the wireless communication control terminal 102 determines the sending assignment time based on that request-to-send. Then it is assumed that the wireless communication unit 105 of the wireless communication control terminal 102 decides to start the data transfer from the wireless communication terminal 101A to the wireless communication terminal 101B at the time point t5, and start the data transfer from the wireless communication terminal 101B to the wireless communication terminal 101A at the time point t6.

The control information containing this sending assignment time is sent from the wireless communication unit 105 of the wireless communication control terminal 102 to the wireless communication units 104A, 104B of the wireless communication terminals 101A, 101B at a time point of t4.

When a time point t5 with the timer 72 set for the received Maximum Length Code as a reference is reached, the data transfer from the wireless communication terminal 101A to the wireless communication terminal 101B starts. When a time point t6 with the timer 72 as a reference is reached, the data transfer from the wireless communication terminal 101B to the wireless communication terminal 101A starts.

FIG. 11 shows the above-mentioned operation expressed on the time basis within one frame. Data is exchanged in a time sharing within a frame, as shown in FIG. 11. Specifically, at the head of a frame, the Maximum Length Code is sent; at the time point t1, the respective wireless communication terminals 101A, 101B are called; at the time points t2 and t3, an acknowledgment signal for this call is returned; at the time point t4, the control signal containing the sending assignment time is sent; at the time point t5, the data transfer from the wireless communication terminal 101A to the wireless communication terminal 101B starts; at the time point t6, the data transfer from the wireless communication terminal 104B to the wireless communication terminal 104B starts.

Since this system employs the OFDM method in this way, it can realize high-speed data rate. Data communication is performed using the unit of one frame on the TDMA, the Maximum Length Code being sent at the head of a frame, and sending and receiving timing being established by taking the Maximum Length Code as a reference.

The respective wireless communication terminals 101A, 101B, . . . are instructed about the sending and receiving time by the control information from the wireless communication control terminal 102. Since the sending and receiving timing is established by using Maximum Length Code at the head of a frame as a reference, each timer 72 of the wireless communication terminals 101A, 101B, . . . is equally set up. Thus, at the receiving time, data can be reproduced by demodulating only a necessary symbol within a frame by using this time information. Further, since data is multiplexed into the same frame from a plurality of wireless communication terminals 101A, 101B, . . . , even if there is a jitter, the data can be demodulated at the same demodulation timing. Therefore, respective signals coming from a plurality of wireless communication terminals 101A, 101B, . . . can be simultaneously received, for data exchange.

Additionally, even if some deviation occurs between the timer at a sending party and the timer at a receiving party, characteristics of the OFDDM can assure demodulation. This makes it needless to acquire synchronization in every burst prior to receiving and to arrange a bit for synchronization in every burst. This results in effective use of bits within a frame.

Figure 12:
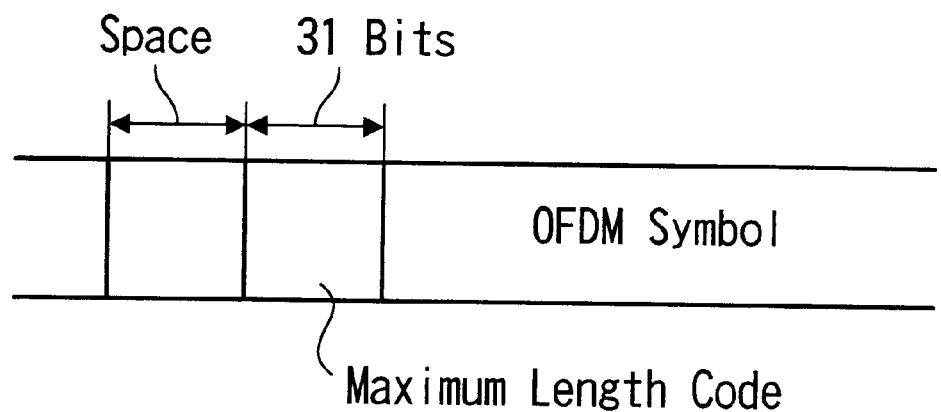
FIG. 12 is a schematic diagram for use in describing a wireless LAN system to which the present invention can be applied.

Although the Maximum Length Code corresponding to one symbol of the OFDM is to be sent at the head of a frame in the above example, a symbol for synchronization is not restricted to one symbol of the OFDM. The length of the symbol for synchronization is variable. As shown in FIG. 12, the length of the Maximum Length Code may be fixed at 31 bits which is shorter than one symbol and a space for this may be provided at the head of a frame, or the length of the Maximum Length Code may be fixed as longer than one symbol. Also, it is not necessary to locate the Maximum Length Code for frame synchronization at the head of a frame, but the Maximum Length Code may be located at a plurality of positions within a frame.

Figure 13:
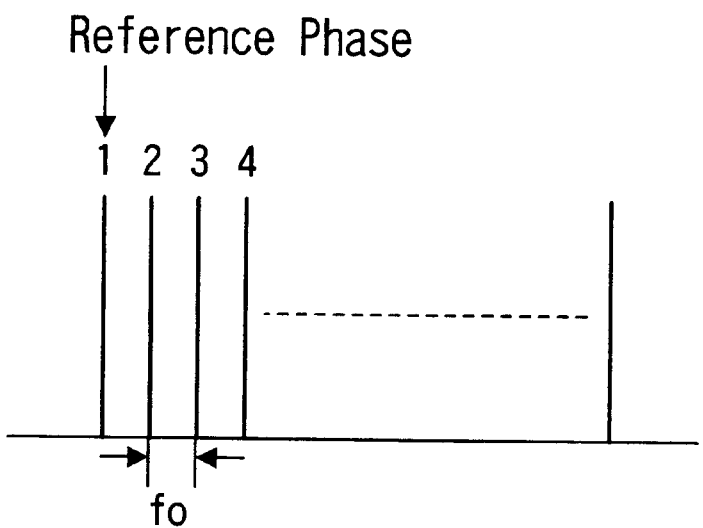
FIG. 13 shows a spectrum for use in describing a wireless LAN system to which the present invention can be applied.

Further, as shown in FIG. 13, the phase difference between subcarriers may be made to have the information. Specifically, differentiation in the direction of frequency is performed in the DQPSK modulation. If there is a deviation in the sample timing at the receiving time, the phase of the QPSK wave of each subcarrier after the FFT in the OFDM demodulation will rotate. Therefore, in order to obtain the accurate QPSK phase, there is a method of assigning a signal of known phase to a part of the OFDM subcarrier as a pilot signal, for making a reference phase. In the example as shown in FIG. 13, a first carrier is given the reference phase and the information is held in the phase difference between subcarriers. By doing this way, even if the phase rotates, the rotated amount between subcarriers is small and so error is small. Although the carrier of given the reference phase is defined as a first carrier in FIG. 13, another carrier may be given the reference phase.

Figure 14A:
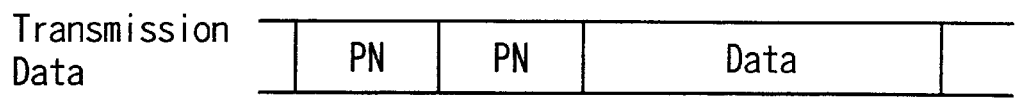
FIG. 14 is a schematic diagram showing an example of a transmission signal (two continuous PN codes) to which the present invention can be applied.
Figure 14B:

As a signal to be received in the structure of this embodiment, a signal having two same successive PN codes at the head of a frame may be received as shown in FIG. 14A. This can improve the reliability of detection because of getting several (two) detected pulses within a frame as an output of a correlation unit, as shown in FIG. 14B.

Figure 15A:
FIG. 15 is a schematic diagram showing an example of a transmission signal (three continuous PN codes) to which the present invention can be applied.
Figure 15B:
Figure 15C:
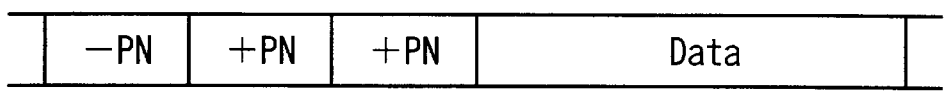

Alternatively, a signal having three same successive PN codes at the head of a frame may be received as shown in FIG. 15A, thereby to improve the reliability of detection further. In this case, the phase of the third PN code may be inverted by 180° as shown in FIG. 15B, or the phase of the first PN code may be inverted by 180° as shown in FIG. 15C. Inversion of the phase in one of the PN codes can help to decide from to its detected phase which PN code within a frame is detected.

Figure 16:
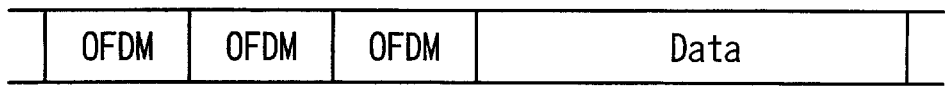
FIG. 16 is a schematic diagram showing an example of a transmission signal (OFDM synchronization signal) to which the present invention can be applied.
Figure 23:
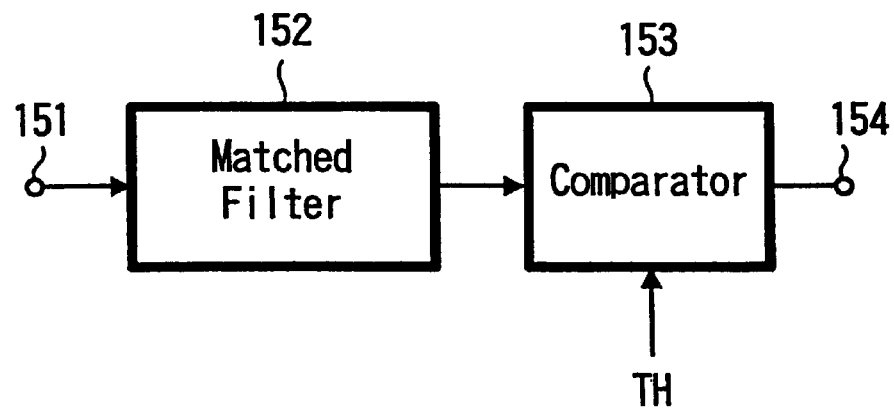
FIG. 23 is a block diagram showing one example of the conventional correlation detecting circuit.
Figure 24:
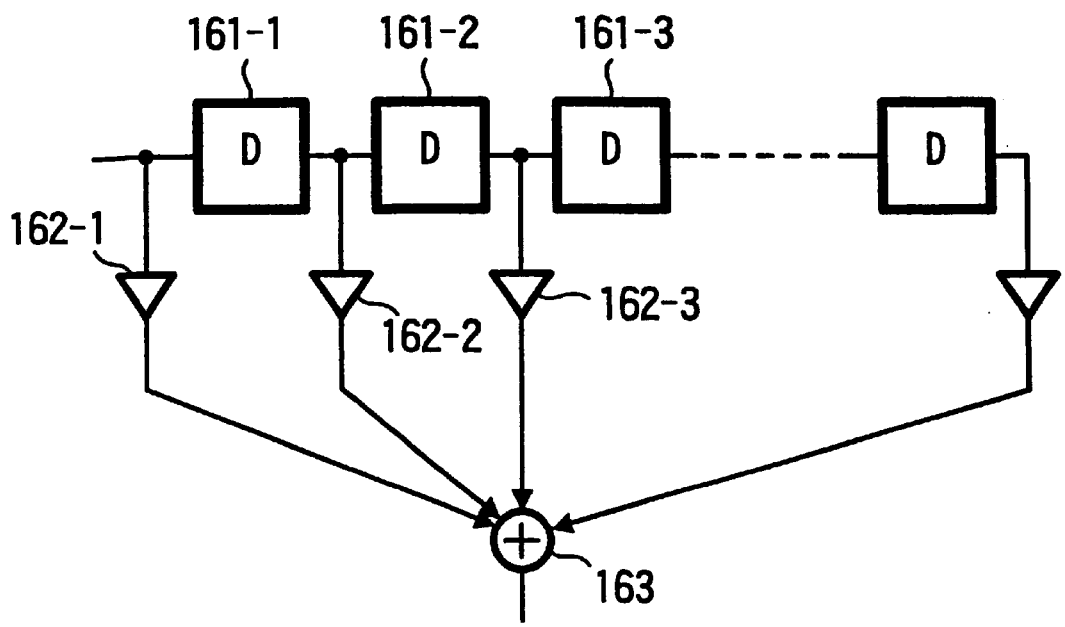
FIG. 24 is a block diagram showing one example of a matched filter.

Moreover, instead of the PN code (Maximum Length Code), it may be arranged to receive a signal having a specified OFDM symbol at the head of a frame as the data for synchronization. When this OFDM symbol is defined as the data for synchronization, it is advantageous in that any special generation circuit for the synchronization data is not required at a sending party. Also in this case, as shown in FIG. 16, it is possible to receive a signal having a plurality of (herein, three) specified OFDM symbols (three) in series as the data for synchronization.

An example of the structure for generating the PN code (Maximum Length Code) at a sending party is shown in FIG. 17. As shown in FIG. 17, it may be generated by using a shift register 201 referred to as an LFSR (Linear Feedback Shift Register) and a FIR filter 202. In this case, a clock CK is supplied from a clock input terminal 203 to the shift register 201 and the FIR filter 202 for activation, and the PN code generated by the shift register 201 is supplied to the FIR filter 202, where band limitation is performed to produce the band-limited PN code at an output terminal 204. For example, assuming that the bandwidth of the OFDM wave of one channel is defined as 30 MHz, the clock frequency being defined as 36. 864 MHz, and the cut-off frequency of the FIR filter 202 being defined as 15 MHz, the band-limited PN code having half the OFDM wave is transferred. The PN code having the same bandwidth as that of the OFDM wave can be transferred by setting the cut-off frequency of the FIR filter 202 less than the Nyquist frequency (fCK/2). In this case, though some energy of high frequency band is lost out of the energy of the PN code, it has no influence on the detecting sensitivity at a receiving party.

As shown in FIG. 18, it may be designed to employ a shift register 211 so as to generate the PN code (Maximum Length Code) or the OFDM wave as a synchronizing signal at a sending party. For example, the shift register 211 for 31 words is prepared and the synchronization data such as the PN code is set therein. The synchronization data such as the PN code with predetermined number of bits (8 bits) starts to be output from the output terminal 214 from a time of getting a pulse LD (FIG. 19B) at the input terminal 213, synchronized with the clock CK (FIG. 19A) obtained at the input terminal 212.

Besides, as shown in FIG. 20, it may be arranged to prepare a ROM 221 storing the PN code (Maximum Length Code) or the OFDM wave as the synchronizing signal at a sending party, so as to supply the synchronization data stored in the ROM 221 according to the count output of a counter 222. In this case, the counter 222 starts counting from the initial value in synchronization with the clock CK (FIG. 21A) obtained by the input terminal 223 at the timing of supplying a start pulse (FIG. 21B) from the input terminal 224, so as to supply the count data (FIG. 21C) indicating read address to the ROM 221 to, and as shown in FIG. 21D, the synchronization data stored in the ROM 221 is supplied from the output terminal 225 as parallel data with predetermined number of bits(8 bits).

Further, as shown in FIG. 22, it may be designed to use the IFFT circuit (Inverse Fast Fourier Transform circuit) 233 at a sending party, so as to generate the PN code as the synchronization date. To be specific, the input coefficient a1 (complex number) of the real part and the imaginary part obtained at the terminals 231 and 232 may be supplied to the IFFT circuit 233, so as to obtain the PN codes PNren and PNimn of the real part and the imaginary part at the output terminals 234 and 235. Here, the IFFT circuit 233 having the number of points n=64 is employed and the input coefficient a1 is a complex number satisfying the condition of the following expression.

$$Pn = \sum_k PN_{kh}(k+n) = \sum_{l=0}^{63} al e^{j2\pi nl/N}$$

$$N = 64 \quad al \in \mathbb{C} \quad (\text{complex number})$$

In the example described so far, data is DQPSK modulated and transferred by multi-carriers in the OFDM method. Alternatively, QAM (Quadrature Amplitude Modulation) that is the multi-valued modulation may be used. For the QAM, there are 16-value, 32-value, 128-value, 256-value and so on. Trellis Code modulation further encoded can be also used.

In the above example, the Maximum Length Code generation circuit 31 is provided in the wireless communication unit 105 on the side of the wireless communication control terminal 102, and the correlation detecting circuit 71 is provided in the wireless communication units 104A, 104B, . . . of the wireless communication terminals 101A, 101B, . . . , respectively. However, the Maximum Length Code generation circuit and the correlation detecting circuit may both be provided in one wireless communication terminal, and depending on whether it is used as the wireless communication control terminal or the wireless communication unit, the Maximum Length Code generation circuit and the correlation detecting circuit may be switched therebetween.

According to the present invention, since the output of a matched filter is compared with the value obtained by multiplying the average amplitude of a received signal by the threshold so as to detect the Maximum Length Code from the received signal, a signal of the Maximum Length Code can be assuredly detected from the received signal. In this case, only the multiplication can serve as the computational processing for correlation detection without any need of division processing requiring large sized circuit, thereby allowing lower power consumption at a low cost to be achieved by in a small sized circuit.

In this case, the average amplitude of a received signal is obtained based on the square of the real part and the square of the imaginary part of complex number expressing the received signal, thereby enabling correlation detection based on the average amplitude of the received signal accurately detected.

In the above-mentioned case, the average amplitude of a received signal is obtained based on the absolute values of the real part and the imaginary part of complex number expressing the received signal, thereby reducing the number of steps and the hardware for the computational processing to find the average amplitude of the received signal and enabling simpler correlation detection.

Having described preferred embodiments of the invention with reference to the accompanying drawings, it is to be understood that the invention is not limited to those precise embodiments and that various changes and modifications could be made therein by those skilled in the art without departing from the spirit or scope of the invention as defined in the appended claims.

What is claimed is:

1. A correlation detecting device comprising:

matched filtering means for detecting a predetermined code arranged at a head of a frame of data in a received signal;

average amplitude detecting means for detecting an average amplitude of the received signal;

multiplying means for multiplying an output of said average amplitude detecting means by a threshold value;

comparing means for producing a correlation detecting signal by comparison between an output of said matched filtering means and an output of said multiplying means; and a timer receiving said correlation detecting signal and producing a synchronization signal indicating a successful detection of said predetermined code for use in synchronizing subsequent processing of said received signal.

2. The correlation detecting device as claimed in claim 1, in which said average amplitude detecting means includes means for obtaining the average amplitude based on a square of a real part and a square of an imaginary part of a complex number representing the received signal.

3. The correlation detecting device as claimed in claim 1, in which said average amplitude detecting means includes means for obtaining the average amplitude based on an absolute value of a real part and an absolute value of an imaginary part of a complex number representing the received signal.

4. A correlation detecting method, comprising the steps of:

detecting a predetermined code arranged at a head of a frame of data in a received signal using a matched filter;

detecting an average amplitude of the received signal and then multiplying the detected average amplitude by a threshold value;

comparing a resultant signal from the step of multiplying with an output of the matched filter and producing a correlation detecting signal based on an output from the step of comparing; and producing a synchronization signal based on said correlation detecting signal indicating a successful detection of said predetermined code for use in synchronizing subsequent processing of said received signal.

5. The correlation detecting method as claimed in claim 4, in which the average amplitude of the received signal is detected based on a square of a real part and a square of an imaginary part of a complex number representing the received signal.

6. The correlation detecting method as claimed in claim 4, in which the average amplitude of the received signal is detected based on an absolute value of a real part and an absolute value of an imaginary part of a complex number representing the received signal.

* * * * *